US010352213B2

(12) United States Patent
Korenaga et al.

(10) Patent No.: US 10,352,213 B2
(45) Date of Patent: Jul. 16, 2019

(54) ELECTRICALLY HEATED CATALYST

(71) Applicant: TOYOTA JIDOSHA KABUSHIKI KAISHA, Toyota-shi, Aichi-ken (JP)

(72) Inventors: Shingo Korenaga, Shizuoka (JP); Keita Hashimoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/156,370

(22) Filed: Oct. 10, 2018

(65) Prior Publication Data
US 2019/0112958 A1 Apr. 18, 2019

(30) Foreign Application Priority Data

Oct. 17, 2017 (JP) ................................. 2017-201024

(51) Int. Cl.
*F01N 3/00* (2006.01)
*F01N 3/20* (2006.01)
(Continued)

(52) U.S. Cl.
CPC .......... *F01N 3/2013* (2013.01); *B01D 53/944* (2013.01); *B01D 53/9431* (2013.01); *B01D 53/9454* (2013.01); *F01N 3/0814* (2013.01); *F01N 3/101* (2013.01); *F01N 3/2066* (2013.01); *F01N 3/2853* (2013.01); *B01D 2255/91* (2013.01); *F01N 2240/16* (2013.01)

(58) Field of Classification Search
CPC .... F01N 3/0184; F01N 3/2066; F01N 3/2013; F01N 3/101; B01D 53/9454; B01D 53/944

USPC ......................................... 422/179, 177, 180
See application file for complete search history.

(56) References Cited

U.S. PATENT DOCUMENTS 7,790,121 B2 * 9/2010 Tanahashi .............. B82Y 30/00
                                                                422/179
7,794,671 B2 * 9/2010 Kariya .................. F01N 3/0211
                                                                422/179
(Continued)

FOREIGN PATENT DOCUMENTS

WO WO 2011/125177 10/2011

OTHER PUBLICATIONS

U.S. Appl. No. 16/124,843, filed Sep. 7, 2018.

*Primary Examiner* — Tom P Duong
(74) *Attorney, Agent, or Firm* — Finnegan, Henderson, Farabow, Garrett & Dunner, LLP

(57) ABSTRACT

In an electrically heated catalyst which is arranged in an exhaust passage, electric leakage is suppressed as much as possible. The electrically heated catalyst comprising: a heat generation element; an electrode; a case; an electrode chamber; and an electrically insulating holding member that is inserted between the outer peripheral surface of the heat generation element and the case, and has an abutment joint portion formed by a pair of end faces which connect from an upstream side end portion to a downstream side end portion of the holding member, and which are arranged in opposition to each other, and an opening portion which is constructed so as to form a predetermined space connected with the electrode chamber in the surrounding of the electrode. The abutment joint portion is arranged in a position which excludes the opening portion, and in which it is not exposed to the electrode chamber.

2 Claims, 8 Drawing Sheets

(51) Int. Cl.
    *F01N 3/10*     (2006.01)
    *F01N 3/08*     (2006.01)
    *B01D 53/94*     (2006.01)
    *F01N 3/28*     (2006.01)

(56) References Cited

U.S. PATENT DOCUMENTS

| | | | | |
|---|---|---|---|---|
| 8,211,373 | B2* | 7/2012 | Olson | F01N 3/2857 |
| | | | | 422/179 |
| 8,580,207 | B2* | 11/2013 | Sugino | F01N 3/0211 |
| | | | | 422/179 |
| 8,784,741 | B2* | 7/2014 | Yoshioka | F01N 3/2026 |
| | | | | 422/177 |
| 2004/0052694 | A1* | 3/2004 | Nishikawa | C04B 35/62245 |
| | | | | 422/177 |
| 2008/0181831 | A1* | 7/2008 | Okabe | F01N 3/2835 |
| | | | | 422/177 |
| 2013/0025267 | A1 | 1/2013 | Yoshioka et al. | |
| 2013/0259754 | A1* | 10/2013 | Murata | F01N 3/2026 |
| | | | | 422/109 |

* cited by examiner

[FIG. 1]
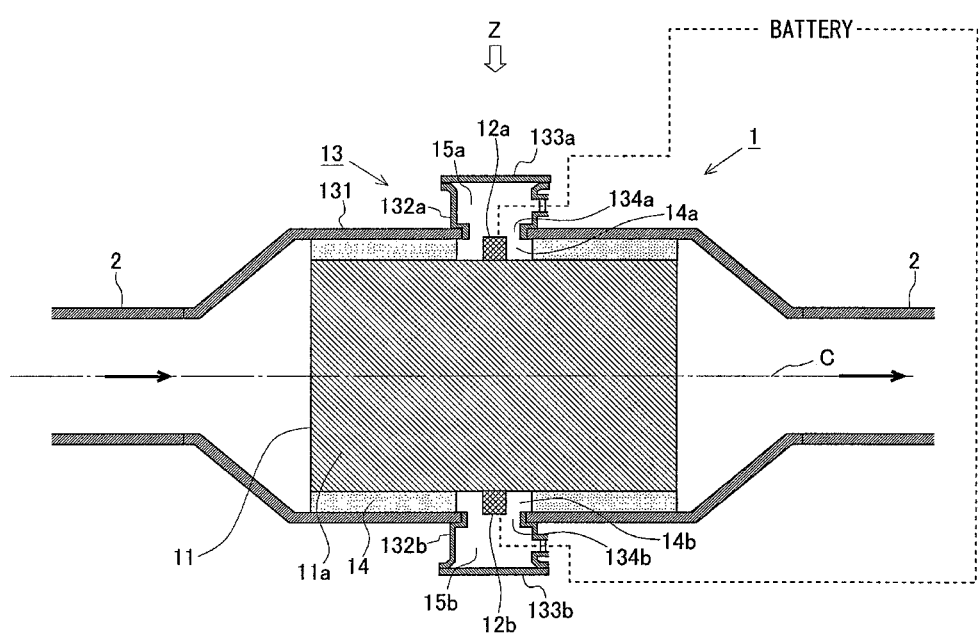

[FIG. 2]
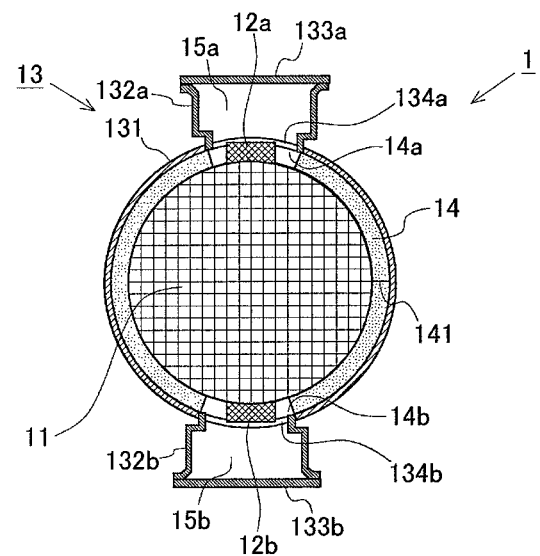
[FIG. 3]
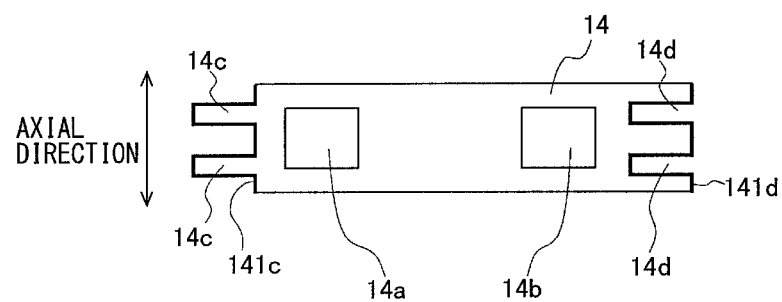

[FIG. 4]
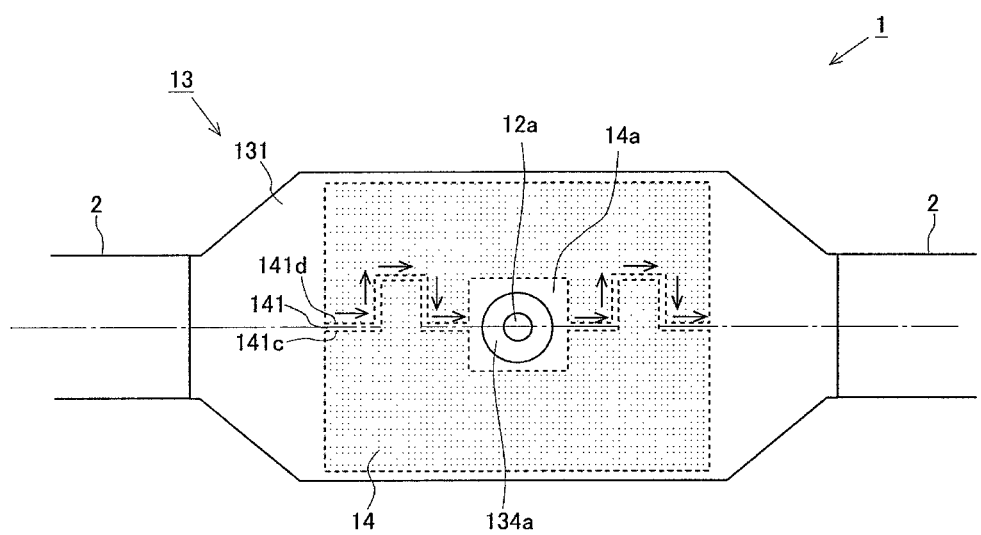

[FIG. 5]
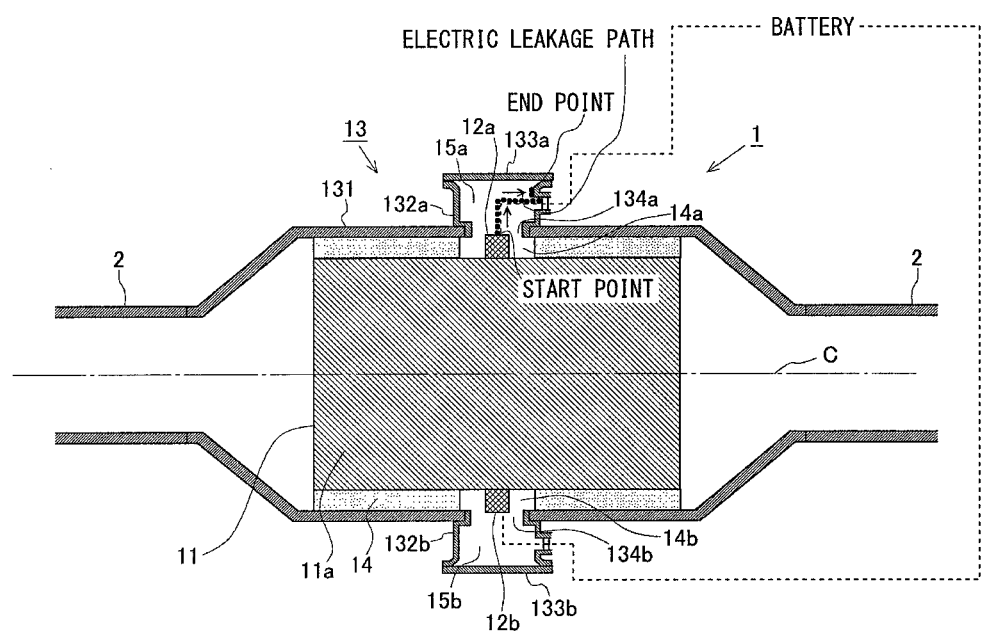

[FIG. 6]
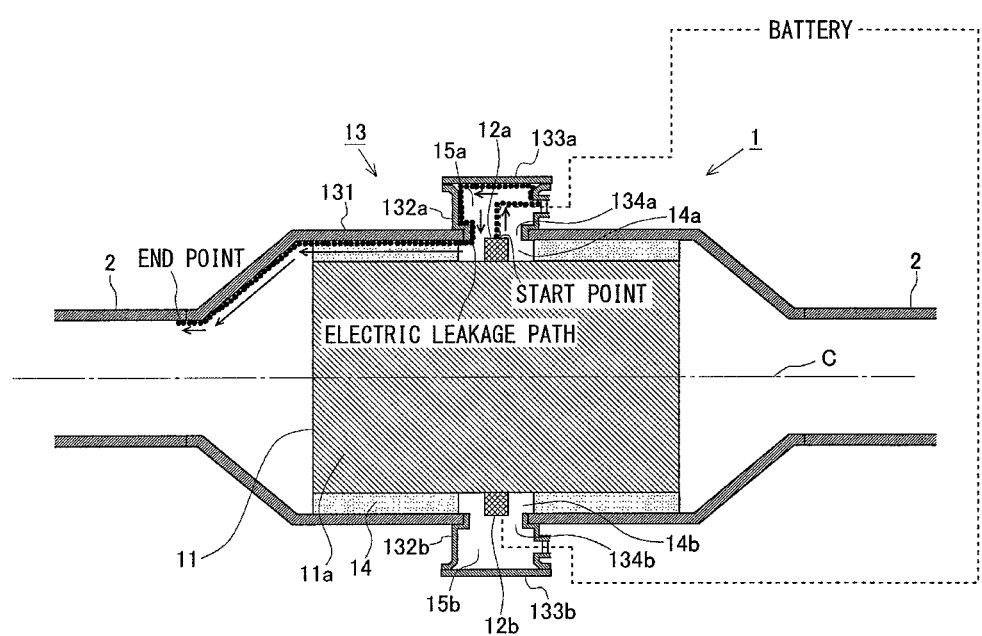

[FIG. 7]
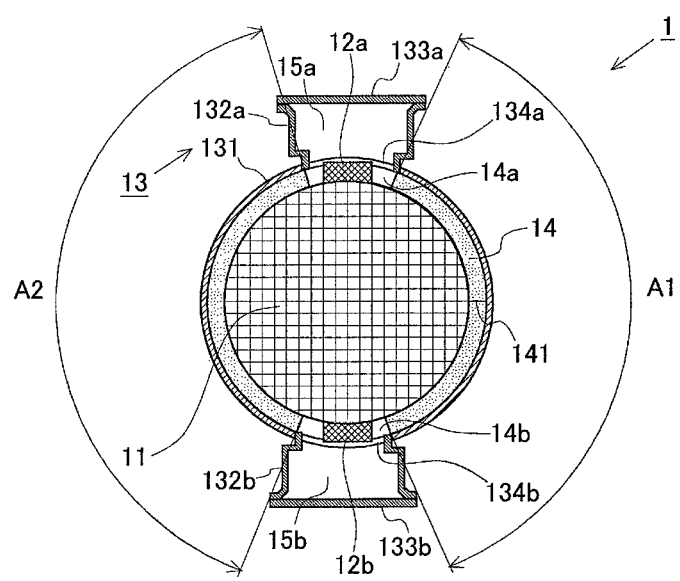

[FIG. 8]
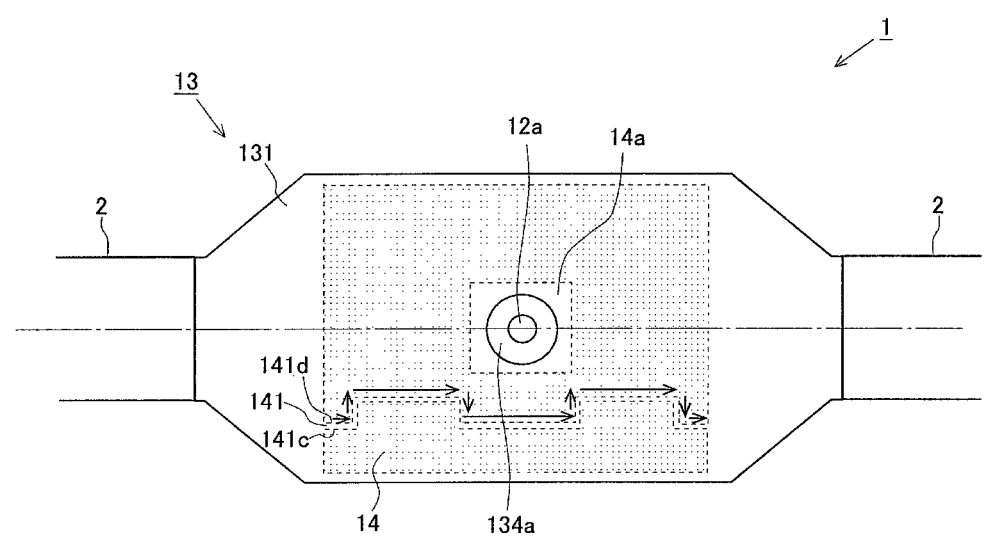

[FIG. 9]
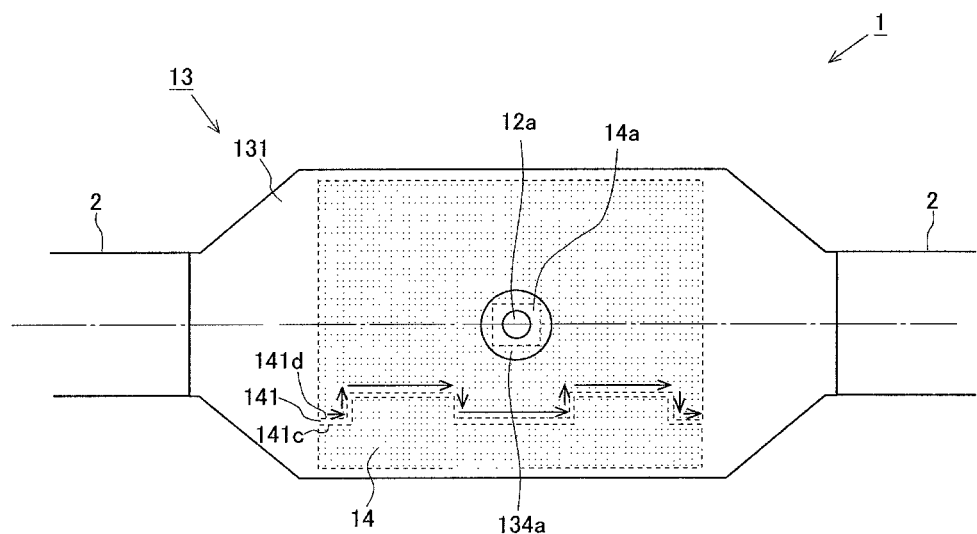

ELECTRICALLY HEATED CATALYST

CROSS-REFERENCE TO RELATED APPLICATIONS

This application claims priority to Japanese Patent Application No. 2017-201024 filed on Oct. 17, 2017, the entire contents of which are incorporated by reference.

BACKGROUND

Technical Field

The present disclosure relates to an electrically heated catalyst that is arranged in an exhaust passage of an internal combustion engine.

Description of the Related Art

In the past, as an exhaust gas purification apparatus arranged in an exhaust passage of an internal combustion engine, there has been developed an electrically heated catalyst (hereinafter, also sometimes referred to as an EHC) in which a catalyst is heated by means of a heat generation element which generates heat by electrical energization thereof.

Then, an EHC described in patent literature 1 is constructed such that a heat generation element is held by a case through a holding member made of an insulating material. Moreover, in the patent literature 1, there is disclosed a technique in which an insulating layer formed of an insulating material is arranged between the case and the holding member.

CITATION LIST

Patent Literature

Patent Literature 1: International Laid-Open Publication No. 2011/125177

SUMMARY

Conductive substances such as, for example, soot, moisture, etc., are contained in the exhaust gas of an internal combustion engine. Accordingly, in an electrically heated catalyst (EHC) arranged in an exhaust passage of the internal combustion engine, suppression of electric leakage or short circuit, which may occur resulting from the conductive substances in the exhaust gas, is required.

On the other hand, in an EHC in which an electrically insulating holding member holding a heat generation element is arranged between the heat generation element and a case, the holding member may be formed with an abutment joint portion, from a manufacturing point of view. Here, note that the abutment joint portion is formed by a pair of end faces which connect from an upstream side end portion to a downstream side end portion of the holding member, and which are arranged in opposition to each other. Thus, by the holding member being formed with the abutment joint portion, it becomes easy to arrange the holding member between the heat generation element and the case, but exhaust gas may flow into the abutment joint portion of the EHC arranged in the exhaust passage of the internal combustion engine. Then, there is a fear that electric leakage or short circuit may occur, resulting from the exhaust gas having flowed into the abutment joint portion.

The present disclosure has been made in view of the problems as referred to above, and has for its object to provide an electrically heated catalyst which can suppress electric leakage or short circuit as much as possible.

Solution to Problem

An electrically heated catalyst according to the present disclosure is one which is arranged in an exhaust passage of an internal combustion engine, said catalyst comprising: a heat generation element that generates heat by electrical energization and heats a catalyst by the generation of heat; an electrode that is connected to an outer peripheral surface of said heat generation element thereby to supply electricity to said heat generation element; a case that receives said heat generation element and said electrode therein; an electrode chamber that is formed between said electrode and said case which is arranged in opposition to said electrode; and an electrically insulating holding member that is inserted between the outer peripheral surface of said heat generation element and said case so as to hold said heat generation element, and has an abutment joint portion formed by a pair of end faces which connect from an upstream side end portion to a downstream side end portion of said holding member, and which are arranged in opposition to each other, and an opening portion which is constructed so as to form a predetermined space connected with said electrode chamber in the surrounding of said electrode.

In such an electrically heated catalyst, the exhaust gas may flow into the abutment joint portion. Here, in the present disclosure, it has been found out that the exhaust gas is easy to flow into the electrode chamber through the abutment joint portion, and that electric leakage may occur when the exhaust gas flows into the electrode chamber. Then, it has been turned out that a situation where the exhaust gas flows into the electrode chamber through the abutment joint portion may occur in cases where the abutment joint portion and the opening portion overlap with each other. Specifically, the exhaust gas having flowed into the abutment joint portion may flow toward the downstream side end portion of the holding member along the abutment joint portion. Accordingly, if the abutment joint portion and the opening portion overlap with each other, the exhaust gas flowing along the abutment joint portion will flow into the opening portion in the way of its flow, and as a result, the exhaust gas will flow into the electrode chamber. Then, when the exhaust gas flows into the electrode chamber, an electric leakage path resulting from conductive substances in the exhaust gas will become easy to be formed. This electric leakage path is formed by the soot attached to the electrode, for example. When the electric leakage path is formed in this manner, there will occur a situation where electricity to be supplied from the electrode to the heat generation element is also supplied to the electric leakage path (in other words, electric leakage or short circuit). Here, note that such electric leakage is apt to cause a problem in cases where a voltage applied to the electrode is relatively high.

Accordingly, in the electrically heated catalyst according to the present disclosure, said abutment joint portion of said holding member is arranged in a position which excludes said opening portion, and in which it is not exposed to said electrode chamber. In the electrically heated catalyst constructed in this manner, the situation where the exhaust gas flowing along the abutment joint portion flows into the electrode chamber is suppressed. In other words, the inflow of the exhaust gas to the electrode chamber is suppressed as much as possible. As a result of this, the formation of the electric leakage path is suppressed, thereby making it possible to suppress electric leakage as much as possible in the electrically heated catalyst.

In addition, in the above-mentioned electrically heated catalyst according to the present disclosure, said case may have an outer cylindrical portion with said heat generation element received therein, and a cover portion which extends in a circumferential direction of said outer cylindrical portion, and which is formed so as to be opposed to said electrode, and said electrode chamber may be formed between said electrode and said cover portion. Moreover, said opening portion may be constructed so that an entire communication opening, which is formed in said outer cylindrical portion and is in communication with said electrode chamber, is exposed to said opening portion, and said abutment joint portion of said holding member may be arranged in a position except said opening portion.

Thus, in the construction in which the entire communication opening is exposed to the opening portion, if exhaust gas flows into the electrode chamber, the exhaust gas will flow into the electrode chamber through the opening portion. Accordingly, in such a construction, the abutment joint portion of the holding member is arranged in the position except the opening portion. This arrangement suppresses a situation where the exhaust gas flowing along the abutment joint portion flows into the predetermined space which is formed by the opening portion. As a result, a situation where the exhaust gas flowing along the abutment joint portion flows into the electrode chamber through the opening portion is suppressed. In other words, according to such a construction, too, the inflow of the exhaust gas to the electrode chamber is suppressed as much as possible. As a result of this, the formation of the electric leakage path is suppressed, thereby making it possible to suppress electric leakage as much as possible in the electrically heated catalyst.

According to the present disclosure, it is possible to provide an electrically heated catalyst which can suppress electric leakage or short circuit as much as possible.

BRIEF DESCRIPTION OF DRAWINGS

FIG. 1 is a view showing the schematic construction of an exhaust gas purification apparatus according to an embodiment of the present disclosure.

FIG. 2 is a view showing the schematic construction of an EHC according to the embodiment of the present disclosure.

FIG. 3 is a view showing the shape of a mat member before being wound around an EHC carrier.

FIG. 4 is a view for explaining the flow of exhaust gas in the mat member in the case of assuming that an abutment joint portion and an opening portion are arranged so as to overlap with each other.

FIG. 5 is a first view showing one mode of an electric leakage path which may occur in cases where the exhaust gas flows into an electrode chamber.

FIG. 6 is a second view showing another mode of the electric leakage path which may occur in cases where the exhaust gas flows into the electrode chamber.

FIG. 7 is a view showing an arrangeable position of the abutment joint portion in the EHC shown in FIG. 2.

FIG. 8 is a first view for explaining the flow of exhaust gas flowing along the abutment joint portion of the mat member, in the EHC according to the embodiment of the present disclosure.

FIG. 9 is a second view for explaining the flow of the exhaust gas flowing along the abutment joint portion of the mat member, in the EHC according to the embodiment of the present disclosure.

DESCRIPTION OF EMBODIMENTS

In the following, modes for carrying out the present disclosure will be specifically described as embodiments for illustrative purposes with reference to the drawings. It should be understood that the dimensions, materials, shapes, relative arrangements, and other features of the components that will be described in connection with the embodiments are not intended to limit the technical scope of the present disclosure only to them, unless stated otherwise.

Reference will be made to the schematic construction of an exhaust gas purification apparatus for an internal combustion engine comprising an electrically heated catalyst (hereinafter, sometimes referred to as an "EHC") according to this embodiment, based on FIG. 1 and FIG. 2. FIG. 1 is a view showing the schematic construction of the exhaust gas purification apparatus according to this embodiment. FIG. 2 is a view showing the schematic construction of the EHC according to this embodiment. FIG. 2 shows a cross section (transverse section) in a direction vertical to the direction of the flow of exhaust gas (i.e., the direction indicated by arrows in FIG. 1) in the EHC 1 of this embodiment. The exhaust gas purification apparatus according to this embodiment is arranged in an exhaust passage of an internal combustion engine which constitutes a hybrid system including the internal combustion engine and an electric motor as drive sources of a vehicle. However, the internal combustion engine to which the EHC according to the present disclosure is applied is not necessarily limited to one which constitutes the hybrid system.

The EHC 1 is provided with an EHC carrier 11, electrodes 12a, 12b, a case 13 and a mat member 14, and is connected to an exhaust pipe 2 made of metal. The EHC carrier 11 and the electrodes 12a, 12b are received in the case 13. The EHC carrier 11 is formed in the shape of a circular column, and is arranged in such a manner that a central axis thereof is in alignment with a central axis C of the exhaust pipe 2. Then, a three-way catalyst 11a is carried or supported by the EHC carrier 11. Here, note that a catalyst supported by the EHC carrier 11 is not limited to the three-way catalyst, but may be an oxidation catalyst, an NOx storage reduction catalyst, or an NOx selective catalytic reduction catalyst.

The EHC carrier 11 is formed of a material which, when electrically energized, becomes an electric resistance to generate heat. Here, note that in this embodiment, the EHC carrier 11 corresponds to a heat generation element according to the present disclosure. As a material for the EHC carrier 11, there can be mentioned SiC by way of example. The EHC carrier 11 has a plurality of passages which extend in a direction in which the exhaust gas flows (i.e., a direction in which the central axis C extends), and which form a honeycomb shape in cross section (transverse section) in a direction vertical to the direction in which the exhaust gas flows. Then, the exhaust gas flows through these passages. Here, note that the cross sectional shape of the EHC carrier 11 in a direction orthogonal to the central axis C may also be elliptical, etc.

The pair of electrodes 12a, 12b are connected to the outer peripheral surface of the EHC carrier 11. The electrodes 12a, 12b each extend along the outer peripheral surface of the EHC carrier 11 in a circumferential direction. Then, the electrode 12a and the electrode 12b are arranged in opposition to each other on the opposite sides of the EHC carrier 11. However, the entire surfaces of the electrodes 12a and the electrodes 12b are not necessarily arranged in opposition to each other. Then, the electrodes 12a, 12b pass through opening portions 14a, 14b formed in the mat member 14 to be described later, respectively, so as to project to the side of the case 13.

Here, the case 13 includes an outer cylindrical portion 131, cover portions 132a, 132b, lid portions 133a, 133b, and communication openings 134a, 134b. The outer cylindrical portion 131 receives the EHC carrier 11. In addition, the communication openings 134a, 134b, which are a pair of openings formed so as to avoid the pair of electrodes 12a, 12b projected to the side of the case 13, are formed in the outer cylindrical portion 131, and the cover portions 132a, 132b are fixed to the peripheries of the communication openings 134a, 134b, respectively. The cover portions 132a, 132b are extended from the outer peripheral surface of the outer cylindrical portion 131 in the circumferential direction thereof so as to cover the electrodes 12a, 12b, respectively, and have openings through which access to the electrodes 12a, 12b is made possible, respectively. Then, a closed space is formed between each of the electrodes 12a, 12b and the case 13 by arranging the lid portions 133a, 133b to cover the individual openings in the cover portions 132a, 132b, respectively. Hereinafter, the closed space between the electrode 12a and the case 13 is referred to as an "electrode chamber 15a", and the closed space between the electrode 12b and the case 13 is referred to as an "electrode chamber 15b". Here, note that the communication openings 134a, 134b can be defined as openings which are in communication with the electrode chambers 15a, 15b, respectively. Moreover, spaces, which are formed in the mat member 14 and defined by the opening portions 14a, 14b of the mat member 14, respectively, are connected with the electrode chambers 15a, 15b, respectively. Thus, the spaces formed in the surroundings of the electrodes 12a, 12b in the mat member 14 are hereinafter referred to as "opening spaces".

Then, battery cables (illustration omitted) are inserted through the cover portions 132a, 132b in a sealed state. These battery cables are connected to the electrodes 12a, 12b in the electrode chambers 15a, 15b, respectively. Then, the EHC carrier 11 is electrically energized by applying a voltage between the electrodes 12a, 12b through the battery cables from a battery.

In the EHC 1, when the EHC carrier 11 generates heat by electrical energization, the three-way catalyst 11a supported on the EHC carrier 11 is heated. This serves to promote the activation of the three-way catalyst 11a. Here, note that in this embodiment, the supply of electric power to the EHC carrier 11 is controlled by an electronic control unit (ECU) which is arranged in combination with the internal combustion engine. In other words, switching of ON/OFF of electrical energization to the EHC carrier 11 and adjustment of the electric power to be supplied to the EHC carrier 11 are carried out by the ECU. In the hybrid system of this embodiment, for example, the internal combustion engine is not started immediately when predetermined engine starting conditions are satisfied, but electrical energization to the EHC carrier 11 of the EHC 1 is carried out before the internal combustion engine is started, after the predetermined engine starting conditions have been satisfied. With this, it can be assumed that when the internal combustion engine is actually started, the temperature of the EHC carrier 11 is in a state where it has risen to the activation temperature of the three-way catalyst 11a. As a result, it becomes possible to purify the exhaust gas in an effective manner from immediately after engine starting. Here, note that in this embodiment, by applying a relatively high direct current voltage of 40 V or higher to the EHC 1, the temperature of the three-way catalyst 11a is raised to its activation temperature, and at the same time, an improvement in the controllability of the temperature of the three-way catalyst 11a is attained.

In addition, in this embodiment, the outer cylindrical portion 131, the cover portions 132a, 132b, and the lid portions 133a, 133b of the case 13 are formed of metal. As a material forming these portions, there can be mentioned a stainless steel material, for example. Then, an inner wall surface of the outer cylindrical portion 131 is coated with glass which is an electrically insulating material. Here, note that the material forming the outer cylindrical portion 131 is not limited to metal, and may be an electrically insulating material such as ceramics, etc.

Then, the mat member 14 is inserted between the case 13 and the outer peripheral surface of the EHC 11. In other words, in the inside of the case 13, the EHC carrier 11 is supported or held by the mat member 14. Here, note that in this embodiment, the mat member 14 correspond to a holding member according to the present disclosure. The mat member 14 is formed of an electrically insulating material. As a material forming the mat member 14, there can be mentioned, by way of example, a ceramic fiber which includes alumina as a main component. Then, in this embodiment, the mat member 14 is wound around the outer peripheral surface of the EHC carrier 11. Thus, the mat member 14 wound around the outer peripheral surface of the EHC carrier 11 has an abutment joint portion 141, as shown in FIG. 2.

Here, the abutment joint portion 141 will be explained below based on FIG. 3. FIG. 3 is a view showing the planar shape of the mat member 14 before being wound around the EHC carrier 11. A vertical direction in FIG. 3 becomes an axial direction of the EHC carrier 11 at the time when the mat member 14 is wound around the EHC carrier 11. As shown in FIG. 3, the mat member 14 is formed with the opening portions 14a, 14b through which the electrodes 12a, 12b pass, respectively, when the mat member 14, is arranged on the outer peripheral surface of the EHC carrier 11. Here, note that in the state shown in FIG. 2, the spaces (opening spaces) formed in the surroundings of the electrodes 12a, 12b of the opening portions 14a, 14b are connected with the electrode chambers 15a, 15b, as mentioned above. In addition, convex portions 14c are formed at one end of the mat member 14, and concave portions 14d are formed at the other end of the mat member 14. Then, when the mat member 14 is wound around the EHC carrier 11, these convex portions 14c and concave portions 14d will be combined or fitted with each other. As a result, the abutment joint portion 141 is formed by a pair of end faces 141c, 141d connected from an upstream side end portion to a downstream side end portion of the mat member 14 in a state where the mat member 14 is sandwiched between the case 13 and the outer peripheral surface of the EHC carrier 11.

In this manner, it becomes possible to produce the EHC 1 according to this embodiment in a relatively easy manner, by arranging the planar mat member 14 on the outer peripheral surface of the EHC carrier 11 while curving it therealong, and further arranging these in the case 13. In addition, in cases where the EHC 1 is produced by using one sheet of the planar mat member 14, as mentioned above, the abutment joint portion 141 formed on the mat member 14 becomes one place or location.

Here, note that the holding member, which serves to hold the EHC carrier 11 in the case 13, is not limited to the mat member 14 wound around the outer peripheral surface of the EHC carrier 11. For example, the EHC carrier 11 may be held by sandwiching the EHC carrier 11 between a pair of electrically insulating half-cylindrical members formed along the outer peripheral surface of the EHC carrier 11, and arranging them in the case 13. In this case, two abutment joint portions will be formed.

Moreover, as mentioned above, the EHC 1 according to this embodiment, a construction is adopted in which the EHC carrier 11 having the three-way catalyst 11a supported thereby is received in the case 13, but the EHC according to the present disclosure is not limited to this. For example, a post-stage catalyst may be arranged at the downstream side of the EHC carrier 11 in the case 13. In addition, between a catalyst carrier of the post-stage catalyst and the case 13, there may be sandwiched a mat member which is formed of the same material as the mat member 14.

With the exhaust gas purification apparatus according to this embodiment in which the EHC 1 as mentioned above is arranged in the exhaust passage of the internal combustion engine, the exhaust gas may flow into the abutment joint portion 141 of the mat member 14. Then, the exhaust gas having flowed into the abutment joint portion 141 may flow toward the downstream side end portion of the mat member 14 along the abutment joint portion 14. Here, in the present disclosure, it has been newly found that when the abutment joint portion 141 and the opening portion 14a or 14b are arranged so as to overlap with each other in the mat member 14, the exhaust gas becomes easy to flow into the electrode chamber 15a or 15b, thus giving rise to a fear that electric leakage or short circuit may occur in the EHC 1. This will be explained below in detail.

FIG. 4 is a view for explaining the flow of exhaust gas in the mat member 14 in the case of assuming that the abutment joint portion 141 and the opening portion 14a are arranged so as to overlap with each other. FIG. 4 is a view looking at the EHC 1 from a viewpoint Z in FIG. 1. Here, note that in order to explain the above-mentioned flow of the exhaust gas, illustration of the cover portion 132a and the lid portion 133a is omitted in FIG. 4, and the mat member 14 received in the case 13 is shown by broken lines. In the abutment joint portion 141 shown in FIG. 4, a gap is formed between the pair of opposed end faces 141c, 141d. For that reason, in the mat member 14, the exhaust gas will flow through this gap. Here, note that the gap formed in the abutment joint portion 141 may be formed at the time when the mat member 14 is arranged on the outer peripheral surface of the EHC carrier 11. Or even if the pair of end faces 141c, 141d are formed to abut with each other at the time when the mat member 14 is arranged on the outer peripheral surface of the EHC carrier 11, these end faces will be separated from each other during the operation of the internal combustion engine, as a result of which a gap may be formed in the abutment joint portion 141. Then, if the abutment joint portion 141 and the opening portion 14a are arranged so as to overlap with each other, as shown in FIG. 4, the exhaust gas (shown by arrows in FIG. 4) flowing through the abutment joint portion 141 (the above-mentioned gap) will flow into the opening space formed by the opening portion 14a in the way of the flow. As mentioned above, this opening space is connected with the electrode chamber 15a. Accordingly, as a result, the exhaust gas having flowed into the opening space flows into the electrode chamber 15a. Here, note that in FIG. 4, the opening portion 14a becomes larger than the communication opening 134a, i.e., it is constructed such that the entire communication opening 134a is exposed, to the opening portion 14a, and as a result, the exhaust gas having flowed into the opening space will flow into the electrode chamber 15a, but if the opening portion 14a is smaller than the communication opening 134a, the exhaust gas will flow into the electrode chamber 15a when the abutment joint portion 141 is exposed to the electrode chamber 15a.

Here, conductive substances (e.g., soot, etc.) in the exhaust gas may adhere to those portions (e.g., a wall surface of the exhaust pipe 2, etc.) through which the exhaust gas flows. Then, when the exhaust gas flows into the electrode chambers 15a, 15b, such conductive substances may also adhere to the electrode chambers 15a, 15b. In that case, in the EHC 1, an electric leakage path resulting from the conductive substances in the exhaust gas will become easy to be formed.

FIG. 5 is a view showing one mode of the electric leakage path which may occur if the exhaust gas flows into the electrode chamber 15a. When the exhaust gas flows into the electrode chamber 15a, the conductive substances (soot, etc.) in the exhaust gas adhere to the electrode 12a, the corresponding battery cable, the inner surface of the cover portion 132a, and the inner surface of the lid portion 133a, for example. In that case, as shown in FIG. 5, there will be formed the electric leakage path which extends from the electrode 12a as a start point to the cover part 132a made of metal as an end point (a flow of electricity in this electric leakage path being shown by arrows in FIG. 5). When the electric leakage path is formed in this manner, there will occur a situation where electricity to be supplied from the electrode 12a to the EHC carrier 11 is also supplied to the electric leakage path, in other words, electric leakage or short circuit will occur. Then, in this embodiment, by applying a relatively high direct current voltage to the EHC 1, the temperature of the three-way catalyst 11a is caused to rise to its activation temperature, and hence, when electric leakage occurs, the voltage applied to the EHC 1 runs short, thus giving rise to a fear that exhaust emissions may be deteriorated.

Further, FIG. 6 is a view showing another mode of the electric leakage path which may occur if the exhaust gas flows into the electrode chamber 15a. Here, note that in the case 13 shown in FIG. 6, the inner surfaces of the cover portions 132a, 132b and the inner surfaces of the lid portions 133a, 133b are coated with glass which is an electrically insulating material. When the exhaust gas flows into the electrode chamber 15a, the conductive substances (soot, etc.) in the exhaust gas adhere to the electrode 12a, the corresponding battery cable, the inner surface of the cover portion 132a, and the inner surface of the lid portion 133a. In addition, in cases where the exhaust gas flows into the electrode chamber 15a through the abutment joint portion 141, the above-mentioned conductive substances adhere to the abutment joint portion 141 (and the wall surface of the outer cylindrical portion 131 along the abutment joint portion 141), too. Then, the above-mentioned conductive substances also adhere to the wall surfaces of the exhaust pipe 2 and the case 13, too. In that case, as shown in FIG. 6, there will be formed the electric leakage path which extends from the electrode 12a as a start point to the wall surface of the exhaust pipe 2 made of metal as an end point (a flow of electricity in this electric leakage path being shown by arrows in FIG. 6).

Here, note that the modes of the electric leakage path shown in FIG. 5 and FIG. 6 are only some examples, but the modes of the electric leakage path, which may be formed in the case where the exhaust gas flows into the electrode chambers 15a, 15b, are not limited to these. For example, if the exhaust pipe 2 has an electric insulation property, the end point of the electric leakage path resulting from the conductive substances in the exhaust gas may become an internal combustion engine body having an electrically conductive property. In addition, even if the inner surfaces of the cover portions 132a, 132b and the inner surfaces of the lid portions 133a, 133b are coated with glass which is an electrically insulating material, the end point of the electric leakage path resulting from the conductive substances in the exhaust gas may be formed in the electrode chambers 15a, 15b. This is because when the lid portions 133a, 133b are fastened to the cover portions 132a, 132b, or when the battery cables are inserted through the cover portions 132a, 132b, the coating of glass may be exfoliated, so that electric conductive portions may be formed on the cover portions 132a, 132b or the lid portions 133a, 133b.

Accordingly, in the EHC 1 according to this embodiment, the abutment joint portion 141 is arranged in a position which excludes the opening portions 14a, 14b and in a position in which it is not exposed to the electrode chambers 15a, 15b. Here, FIG. 7 is a view showing an arrangeable position of the abutment joint portion 141 in the cross section of the EHC 1 shown in FIG. 2. In the cross section of the mat member 14 shown in FIG. 7, those ranges which exclude the opening portions 14a, 14b and which are not exposed to the electrode chambers 15a, 15b are represented as a range A1 and a range A2. Then, in the EHC 1 according to this embodiment, the abutment joint portion 141 can be arranged in a position which excludes the opening portions 14a, 14b in the above-mentioned cross section and which is not exposed to the electrode chambers 15a, 15b, i.e., in a position which falls within the range A1 or A2 in FIG. 7.

In addition, FIG. 8 is a first view for explaining the flow of exhaust gas flowing along the abutment joint portion 141 of the mat member 14, in the EHC 1 according to the embodiment of the present disclosure. In the mat member 14 shown in FIG. 8, the abutment joint portion 141 is arranged in the position which excludes the opening portions 14a, 14b and in which it is not exposed to the electrode chambers 15a, 15b, as mentioned above. Here, note that FIG. 8 is a view from the same viewpoint as in the above-mentioned FIG. 4, wherein illustration of the cover portion 132a and the lid portion 133a is omitted, similar to FIG. 4, and the mat member 14 received in the case 13 is shown by broken lines.

In the EHC 1 according to this embodiment, as shown in FIG. 8, the exhaust gas (shown by arrows in FIG. 8) flowing through the abutment joint portion 141 flows from the upstream side end portion to the downstream side end portion of the mat member 14, without flowing into the opening spaces formed by the opening portions 14a, 14b in the way of the flow. This suppresses a situation where the exhaust gas flowing along the abutment joint portion 141 flows into the opening spaces and, as a result, flows into the electrode chambers 15a, 15b. In other words, the inflow of the exhaust gas to the electrode chambers 15a, 15b is suppressed as much as possible. Here, note that in FIG. 8, the opening portion 14a becomes larger than the communication opening 134a, i.e., the entire communication opening 134a is exposed to the opening portion 14a, but even in cases where the opening portion 14a is smaller than the communication opening 134a, as shown in FIG. 9, the inflow of the exhaust gas to the electrode chambers 15a, 15b is suppressed as much as possible, by arranging the abutment joint portion 141 in the position in which the abutment joint portion 141 is not exposed to the electrode chambers 15a, 15b.

Then, because the inflow of the exhaust gas to the electrode chambers 15a, 15b is suppressed as much as possible, formation of an electric leakage path as mentioned above is suppressed. Accordingly, in the EHC 1 according to this embodiment, electric leakage can be suppressed as much as possible.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electrically heated catalyst which is arranged in an exhaust passage of an internal combustion engine, said catalyst comprising:
    a heat generation element that generates heat by electrical energization and heats a catalyst by the generation of heat;
    an electrode that is connected to an outer peripheral surface of said heat generation element thereby to supply electricity to said heat generation element;
    a case that receives said heat generation element and said electrode therein;
    an electrode chamber that is formed between said electrode and said case which is arranged in opposition to said electrode; and
    an electrically insulating holding member that is inserted between the outer peripheral surface of said heat generation element and said case so as to hold said heat generation element, and has an abutment joint portion formed by a pair of end faces which connect from an upstream side end portion to a downstream side end portion of said holding member, and which are arranged in opposition to each other, and an opening portion which is constructed so as to form a predetermined space connected with said electrode chamber in the surrounding of said electrode;
    wherein said abutment joint portion of said holding member is arranged in a position which excludes said opening portion, and in which it is not exposed to said electrode chamber.

2. The electrically heated catalyst as set forth in claim 1, wherein
    said case has an outer cylindrical portion with said heat generation element received therein, and a cover portion which extends in a circumferential direction of said outer cylindrical portion, and which is formed so as to be opposed to said electrode;
    said electrode chamber is formed between said electrode and said cover portion;
    said opening portion is constructed so that an entire communication opening, which is formed in said outer cylindrical portion and is in communication with said electrode chamber, is exposed to said opening portion; and
    said abutment joint portion of said holding member is arranged in a position except said opening portion.

* * * * *